June 1, 1926.  
E. R. RITTER  
ATTACHABLE VEHICLE BRAKE  
Filed April 5, 1924
1,587,421
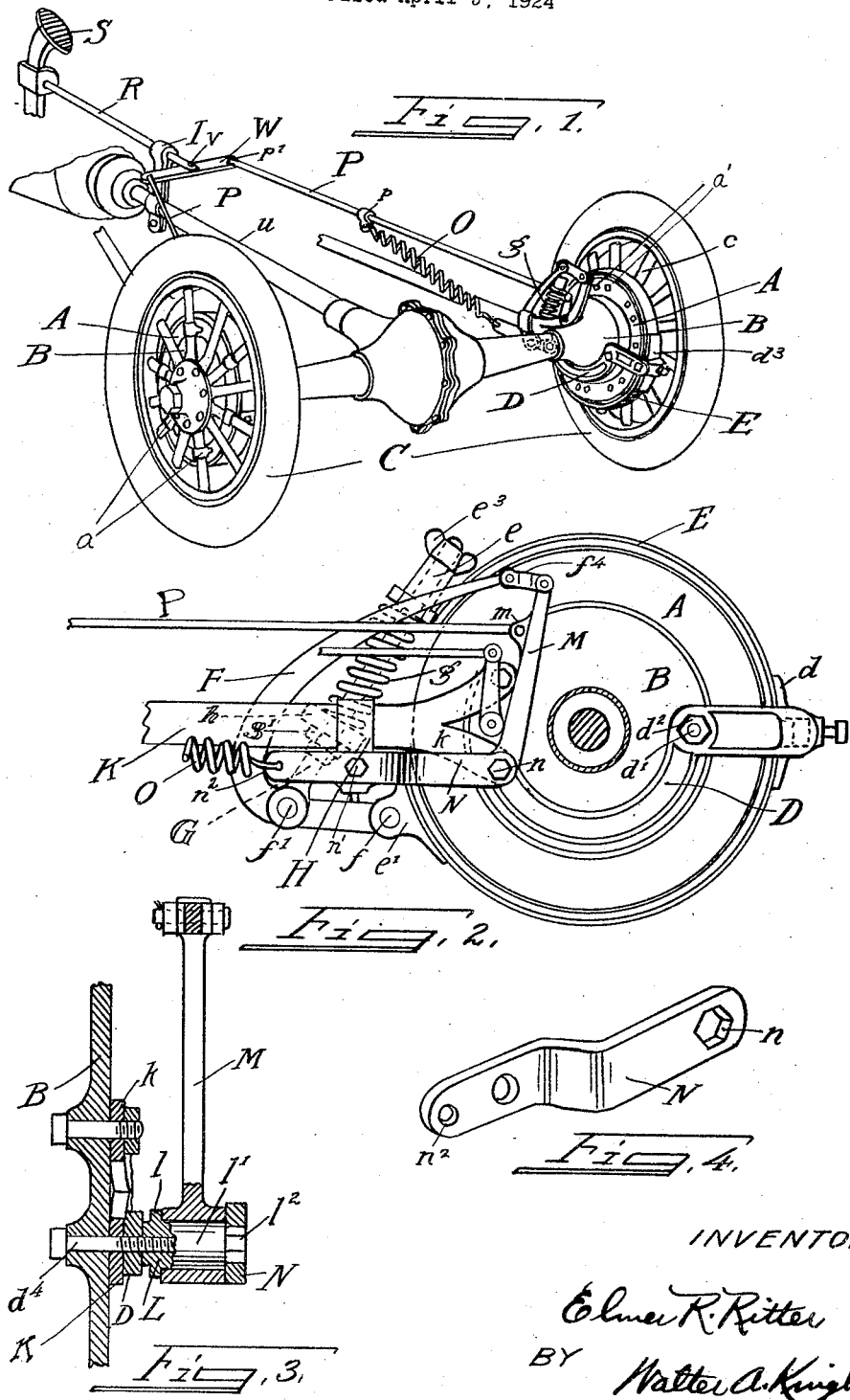
INVENTOR  
Elmer R. Ritter  
BY  
Walter A. Knight  
ATTORNEY.

Patented June 1, 1926.

1,587,421

UNITED STATES PATENT OFFICE.

ELMER R. RITTER, OF CINCINNATI, OHIO.

ATTACHABLE VEHICLE BRAKE.

Application filed April 5, 1924. Serial No. 704,381.

My invention relates to vehicles brakes and more particularly to attachable brakes for automobiles.

The object of my invention is to provide a strong, reliable brake of few parts and simple construction that can be readily attached to a wheel and adjoining parts of an automobile.

A further object of my invention is to ensure the relative rigidity of the various brake parts.

This invention shows a brake combination which is an improvement over my earlier invention as set forth in Patent No. 1,452,439 issued April 17, 1923.

In said patent the brake actuating lever is secured to a bracket which in turn is secured to the radius rod of the vehicle; great difficulty has been experienced in holding this bracket rigidly in place and it has been found to readily work loose after being in operation for a short while, thereby causing the brake to operate inefficiently. In my improved construction as set forth in this application, I overcome this difficulty by securing the actuating lever of the brake to the axle housing of the vehicle and the radius rod.

My invention is illustrated in the accompanying drawings in which

Fig. 1 is a perspective of the rear axle, adjoining wheels and drive tube of an automobile showing my improved brake attached thereto, Fig. 2 is a side elevation showing the axle housing of an automobile and the positioning of the brake drum and adjoining parts relative thereto, Fig. 3 is a vertical axial section thru the axle housing showing the preferred method of securing the intermediate brake operating lever thereto, and Fig. 4 is a detail showing the connecting bar N.

Referring now to the drawings:

An attachable brake drum A preferably made in one piece and of pressed steel is adapted to fit snugly over the axle housing B and is held in place thereon by means of the U bolts $a$ and screws $a^1$ which secure said brake drum to the spokes $c$ of the rear wheel C.

A brake band E provided with brackets $e$, $e^1$ disposed one at each end thereof is held in position around the brake drum, by means of the supporting bracket $d$, which is supported by yoke member D firmly secured to the axle housing of the automobile by the threaded bolt $d^1$ and nut $d^2$.

One end of a bell crank lever F is secured at $f$ to the lower bracket $e^1$, and is connected intermediate its length at $f^1$ to the lower end of the tension rod G, the upper end of the tension rod G being secured to the upper bracket $e$ by the winged nut $e^3$.

A bracket H is secured to the radius rod K of the automobile and is provided with a slotted lug $h$ on the outer side thereof, through which the tension rod G passes.

A spring $g$ carried by the tension rod G is positioned between the lug $h$ and the upper bracket $e$, so as to tend to hold the ends of the brake bands apart.

Nut $g^1$ threaded to the tension rod G is adapted to loosen or tighten the spring $g$.

Referring now more particularly to Fig. 3, a lever supporting member L provided with an annular flange $l$ is internally threaded to receive the bolt $d^4$ which passes through the axle housing B so as to firmly hold the lower prong $k$ of the radius rod K and one end of yoke D to the axle housing.

Said member L is provided with a bearing portion $l^1$ and the hexagonal shaped extension $l^2$.

An intermediate brake operating lever M is journalled on the bearing portion $l^1$ of the supporting member L and is held in place thereon by the spacing bar N provided with a hexagonal opening $n$ at one end thereof which fits over the hexagonal extension $l^2$ of the supporting member L.

The spacing bar N is secured to the bracket H at $n^1$ and is bored at $n^2$ so as to receive one end of the spring O the other end of said spring O being secured to a bracket $p$ on the connecting pull rod P (see Fig. 1) so as to assist in the return of the brake to open position after each braking operation.

It will be seen that the bar N acts as a locating member for bracket H and as a spacer between the bearing $l^1$ and the bracket H and locks L against rotation; L acting as a lock nut for lower radius rod bolt $d^4$.

The upper end of the bell crank lever F is connected to the intermediate brake operating lever M by the link $f^4$.

A pull rod R, secured to the pedal S passes through the bracket I secured to the drive tube U and is secured at $v$ to the equalizing cross bar W. Rod P secured at $p^1$ to the equalizing cross bar W is connected to the bracket m formed integral with the intermediate brake operating lever M and transmits power from pedal S to the intermediate operating lever M.

While I have described my improved brake connection as secured to one of the rear wheels it will be seen from the drawings that I propose to have one such brake on the inner side of each of the rear wheels.

What I claim and desire to secure by Letters Patent of the United States is:

1. In an attachable brake for an automobile; the combination of a brake drum, means for securing said drum to a wheel of said automobile, operating means for exerting braking pressure on said drum, a principal bearing to which said operating means is secured, a support for part of said operating means secured to the axle housing, a bracket secured to the radius rod acting as a support for another part of said operating means, and a bar acting as a locating member for said bracket and as a spacer between said bracket and the principal bearing of said braking means.

2. In an attachable brake for an automobile; the combination of a brake drum, means for securing said drum to a wheel of said automobile, operating means for exerting braking pressure on said drum, a support for part of said operating means secured to the axle housing, a bracket secured to the radius rod acting as a support for another part of said operating means, a supporting member forming the principal bearing of said braking means and a bar acting as a locating member for said bracket and as a spacer between said bracket and said supporting means which forms said principal bearing.

3. In an attachable brake for an automobile; the combination of a brake drum, means for securing said drum to a wheel of said automobile, operating means for exerting braking pressure on said drum; a support for part of said operating means secured to the axle housing, a bracket secured to the radius rod acting as a support for another part of said operating means, a supporting member forming the principal bearing of said braking means, a bolt adapted to secure together said bearing member, radius rod and axle housing, and a bar acting as a locating member for said bracket and as a spacer between said bracket and said supporting means which forms said principal bearing.

4. In an attachable brake for an automobile; the combination of a brake drum, means for securing said drum to a wheel of said automobile, operating means for exerting braking pressure on said drum, a support for part of said operating means secured to the axle housing, a bracket secured to the radius rod acting as a support for another part of said operating means, a supporting member forming the principal bearing of said braking means, a bar acting as a locating member for said bracket and as a spacer between said bracket and said supporting means which forms said principal bearing and coacting means on said bearing member and bar for preventing the rotation of said bearing member.

5. In an attachable brake for an automobile; a brake drum, means for securing said drum to a wheel of said automobile, a brake band having separated ends, a brake band support mounted on the axle housing for maintaining said brake band in operating position with relation to said drum, operating means including two levers adapted to draw said brake band ends nearer together for exerting braking pressure on said drum, a support for one of said levers of said operating means secured to the axle housing, a bracket secured to the radius rod acting as a support for said other lever of said operating means, a supporting member forming the principal bearing of said braking means, a bolt adapted to secure together said bearing member, radius rod and axle housing, a bar acting as a locating member for said bracket and as a spacer between said bracket and said supporting means which forms said principal bearing and coacting means on said bearing member and said bar for preventing the rotation of said bearing member.

In testimony whereof I have hereunto set my hand.

ELMER R. RITTER.